(12) United States Patent
Nelson

(10) Patent No.: US 10,743,124 B1
(45) Date of Patent: Aug. 11, 2020

(54) PROVIDING MIXED REALITY AUDIO WITH ENVIRONMENTAL AUDIO DEVICES, AND RELATED SYSTEMS, DEVICES, AND METHODS

(71) Applicant: IGT, Las Vegas, NV (US)

(72) Inventor: Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/409,155

(22) Filed: May 10, 2019

(51) Int. Cl.
| | |
|---|---|
| H04S 5/00 | (2006.01) |
| H04R 1/10 | (2006.01) |
| G06T 19/00 | (2011.01) |
| H04N 13/344 | (2018.01) |
| H04R 5/027 | (2006.01) |
| A63F 13/211 | (2014.01) |

(52) U.S. Cl.
CPC .............. *H04S 5/00* (2013.01); *A63F 13/211* (2014.09); *G06T 19/006* (2013.01); *H04N 13/344* (2018.05); *H04R 1/1083* (2013.01); *H04R 5/027* (2013.01); *H04S 2400/15* (2013.01)

(58) Field of Classification Search
USPC ....................... 381/17, 26, 58, 150, 309, 310
See application file for complete search history.

(56) References Cited

U.S. PATENT DOCUMENTS

| | | | |
|---|---|---|---|
| 8,235,529 B1 | 8/2012 | Raffle et al. | |
| 8,558,759 B1 | 10/2013 | Prada et al. | |
| 8,821,274 B2 | 9/2014 | Lyons et al. | |
| 8,943,420 B2 | 1/2015 | Goldthwaite et al. | |
| 9,280,867 B2 | 3/2016 | Froy et al. | |
| 9,280,868 B2 | 3/2016 | Froy et al. | |
| 9,285,592 B2 | 3/2016 | Olsson et al. | |
| 9,412,201 B2 | 8/2016 | Kinnebrew et al. | |
| 9,558,612 B2 | 1/2017 | Lyons et al. | |
| 9,568,620 B2 | 1/2017 | Froy et al. | |
| 9,569,920 B2 | 2/2017 | Froy et al. | |
| 2014/0121015 A1* | 5/2014 | Massing | G07F 17/3211 463/33 |
| 2014/0168261 A1* | 6/2014 | Margolis | G06F 3/011 345/633 |
| 2016/0373570 A1 | 12/2016 | Scavezze et al. | |
| 2019/0116448 A1* | 4/2019 | Schmidt | G06F 3/167 |

* cited by examiner

*Primary Examiner* — Yosef K Laekemariam
(74) *Attorney, Agent, or Firm* — Sage Patent Group

(57) ABSTRACT

Systems, devices, and methods provide mixed reality audio with environmental audio devices. A mixed reality device providing mixed reality content to a user has a mixed reality device position in an environment that includes a plurality of audio devices. A mixed reality audio element is determined, which is associated with the mixed reality content and which has a virtual source position with respect to the mixed reality device position within the environment. An audio device position of a particular audio device of the plurality of audio devices is determined, with respect to the mixed reality device position and the virtual source position within the environment. The particular audio device generates the mixed reality audio element to cause the user of the mixed reality device to perceive the mixed reality audio element as originating from the virtual source position within the environment.

20 Claims, 12 Drawing Sheets

800

```
┌─────────────────────────────────────────┐
│ DETERMINING, BY A PROCESSOR CIRCUIT, A  │
│ MIXED REALITY DEVICE POSITION OF A      │
│ MIXED REALITY DEVICE PROVIDING MIXED    │
│ REALITY CONTENT TO A USER IN AN         │
│ ENVIRONMENT COMPRISING A PLURALITY OF   │
│ AUDIO DEVICES                           │
│                  802                    │
└─────────────────────────────────────────┘
                    │
                    ▼
┌─────────────────────────────────────────┐
│ DETERMINING A VIRTUAL SOURCE POSITION   │
│ FOR A MIXED REALITY AUDIO ELEMENT WITH  │
│ RESPECT TO THE MIXED REALITY DEVICE     │
│ POSITION WITHIN THE ENVIRONMENT,        │
│ WHEREIN THE MIXED REALITY AUDIO         │
│ ELEMENT IS ASSOCIATED WITH THE MIXED    │
│ REALITY CONTENT                         │
│                  804                    │
└─────────────────────────────────────────┘
                    │
                    ▼
┌─────────────────────────────────────────┐
│ CAUSING A PARTICULAR AUDIO DEVICE OF    │
│ THE PLURALITY OF AUDIO DEVICES TO       │
│ GENERATE THE MIXED REALITY AUDIO        │
│ ELEMENT TO CAUSE THE USER OF THE MIXED  │
│ REALITY DEVICE TO PERCEIVE THE MIXED    │
│ REALITY AUDIO ELEMENT AS ORIGINATING    │
│ FROM THE VIRTUAL SOURCE POSITION        │
│ WITHIN THE ENVIRONMENT                  │
│                  806                    │
└─────────────────────────────────────────┘
```

*FIG. 8*

PROVIDING MIXED REALITY AUDIO WITH ENVIRONMENTAL AUDIO DEVICES, AND RELATED SYSTEMS, DEVICES, AND METHODS

BACKGROUND

Embodiments described herein relate to mixed reality, and in particular to providing mixed reality audio with environmental audio devices, and related systems, devices, and methods. Mixed reality experiences may increase enjoyment and immersion by providing audio content that accompanies visual content during the mixed reality experience. For example, a user using modified glasses or a mobile device (such as a mobile phone) may view virtual visual content alongside real-world content, so that the user perceives the visual content as being part of the real-world content. The audio capabilities of existing devices may not be sufficient to provide audio quality and effects that are suitable for mixed reality applications, which may detract from the immersive effect of the mixed reality experience and my decrease the enjoyment of the user.

SUMMARY

According to an embodiment, a system for providing mixed-reality audio is disclosed. The system includes a processor circuit and a memory coupled to the processor circuit. The memory includes machine-readable instructions that, when executed by the processor circuit, cause the processor circuit to determine a mixed reality device position of a mixed reality device providing mixed reality content to a user in an environment that includes a plurality of audio devices. The machine-readable instructions further cause the processor circuit to determine a mixed reality audio element associated with the mixed reality content. The machine-readable instructions further cause the processor circuit to determine a virtual source position for the mixed reality audio element with respect to the mixed reality device position within the environment. The machine-readable instructions further cause the processor circuit to determine an audio device position of a particular audio device of the plurality of audio devices with respect to the mixed reality device position and the virtual source position within the environment. The machine-readable instructions further cause the processor circuit to cause the particular audio device to generate the mixed reality audio element to cause the user of the mixed reality device to perceive the mixed reality audio element as originating from the virtual source position within the environment.

According to another embodiment, a method for providing mixed-reality audio is disclosed. The method includes determining, by a processor circuit, a mixed reality device position of a mixed reality device providing mixed reality content to a user in an environment that includes a plurality of audio devices. The method further includes determining a virtual source position for a mixed reality audio element with respect to the mixed reality device position within the environment, wherein the mixed reality audio element is associated with the mixed reality content, The method further includes causing a particular audio device of the plurality of audio devices to generate the mixed reality audio element to cause the user of the mixed reality device to perceive the mixed reality audio element as originating from the virtual source position within the environment.

According to another embodiment, a system for providing mixed-reality audio is disclosed. The system includes a mixed reality device, a plurality of electronic gaming devices at a plurality of gaming device positions in a casino environment, a processor circuit, and a memory coupled to the processor circuit. The memory includes machine-readable instructions that, when executed by the processor circuit, cause the processor circuit to cause the mixed reality device to provide mixed reality content to a user in the environment. The machine-readable instructions further cause the processor circuit to determine a virtual source position for a mixed reality audio element with respect to the mixed reality device position within the casino environment, wherein the mixed reality audio element is associated with the mixed reality content, and wherein the virtual source position is associated with a gaming device position of a first electronic gaming device of the plurality of electronic gaming devices. The machine-readable instructions further cause the processor circuit to cause the first electronic gaming device to generate the mixed reality audio element.

BRIEF DESCRIPTION OF THE DRAWINGS

FIG. 8 is a flowchart illustrating operations of systems/methods according to some embodiments.

DETAILED DESCRIPTION

Embodiments described herein relate to mixed reality, and in particular to providing mixed reality audio with environmental audio devices, and related systems, devices, and methods. In some embodiments, a mixed reality device providing mixed reality content to a user has a mixed reality device position in an environment that includes a plurality of audio devices. A mixed reality audio element, which is associated with the mixed reality content and which has a virtual source position with respect to the mixed reality device position within the environment, is determined. An audio device position of a particular audio device of the plurality of audio devices is determined, with respect to the mixed reality device position and the virtual source position within the environment. The particular audio device generates the mixed reality audio element to cause the user of the mixed reality device to perceive the mixed reality audio element as originating from the virtual source position within the environment. These and other embodiments provide a unique solution to the technical problem of providing a more realistic and immersive mixed reality experience for users.

Figure 1:
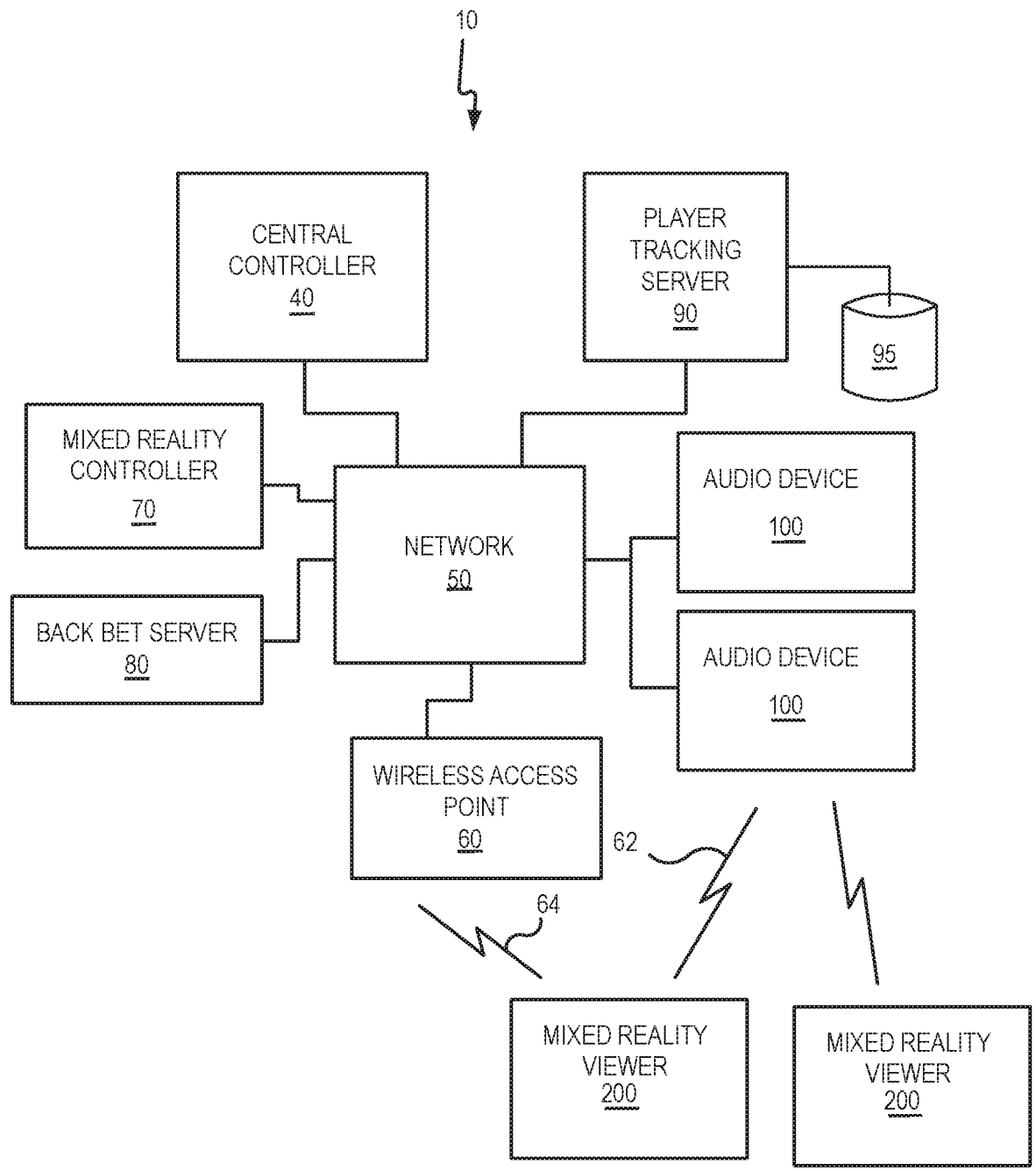
FIG. 1 is a schematic block diagram illustrating a network configuration for a plurality of gaming devices according to some embodiments.

Before discussing aspects of the embodiments disclosed herein, reference is made to FIG. 1, which illustrates a networked system 10 that includes a plurality of environmental audio devices 100 and mixed reality viewers 200. The system 10 may be located, for example, on the premises of a gaming establishment, such as a casino. The audio devices 100, which may be standalone audio devices or components of other devices, such as gaming devices that provides wagering opportunities (e.g., sports betting, slot play, etc.) on a casino floor or other environment, may be in communication with each other and/or at least one central controller 40 through a data network 50 and/or remote communication link. The network 50 may be a private data communication network that is operated, for example, by the gaming facility that operates the audio devices 100. Communications over the network 50 may be encrypted for security. The central controller 40 may be any suitable server or computing device which includes at least one processor and at least one memory or storage device. Each audio device 100 may be a passive device, or may be a smart device that includes a processor that transmits and receives events, messages, commands or any other suitable data or signal between the audio devices 100 and the central controller 40. The audio device processor is operable to execute such communicated events, messages or commands in conjunction with the operation of the audio device 100. Moreover, the processor of the central controller 40 is configured to transmit and receive events, messages, commands or any other suitable data or signal between the central controller 40 and each of the individual audio devices 100. In some embodiments, one or more of the functions of the central controller 40 may be performed by one or more audio device processors. Moreover, in some embodiments, one or more of the functions of one or more audio device processors as disclosed herein may be performed by the central controller 40.

A wireless access point 60 provides wireless access to the network 50. The wireless access point 60 may be connected to the data communication network 50 as illustrated in FIG. 1, or may be connected directly to the central controller 40 or another server connected to the network 50.

A player tracking server 90 may also be connected through the network 50. The player tracking server 90 may manage a player tracking account that tracks the player's gameplay and spending and/or other player preferences and customizations, manages loyalty awards for the player, manages funds deposited or advanced on behalf of the player, and other functions. Player information managed by the player tracking server 90 may be stored in a player information database 95.

As further illustrated in FIG. 1, a mixed reality viewer 200, or augmented reality (AR) viewer, is provided. It should be understood that aspects of embodiments disclosed herein are applicable to mixed reality (which may also be referred to as augmented reality (AR)) and/or virtual reality (VR) applications, as well as other applications. The mixed reality viewer 200 communicates with one or more elements of the system 10 to render two-dimensional (2D) and/or three-dimensional (3D) content to a user, e.g., a player or casino operations worker, in a virtual space, while at the same time allowing the casino operations worker to see objects in the real space around the user, e.g., on the casino floor. That is, the mixed reality viewer 200 combines a virtual image with real images perceived by the user, including images of real objects. In this manner, the mixed reality viewer 200 "mixes" real and virtual reality into a single viewing experience for the user. In some embodiments, the mixed reality viewer 200 may be further configured to enable the user to interact with both the real and virtual objects displayed to the player by the mixed reality viewer 200. In some embodiments, the mixed reality viewer 200 may be replaced with a VR viewer that combines a video signal of a real event with virtual reality elements to generate a single mixed reality viewing experience via a VR display.

The mixed reality viewer 200 communicates with one or more elements of the system 10 to coordinate the rendering of mixed reality images, and in some embodiments mixed reality 3D images, and the providing of audio elements to the user. For example, in some embodiments, the mixed reality viewer 200 may communicate directly with an audio device 100 over a wireless interface 62, which may be a Wi-Fi link, a Bluetooth link, an NFC link, etc. For example, in some embodiments, the mixed reality viewer 200 may transmit digital sound recordings through the network 50 directly to the audio devices 100. In other embodiments, a host, such as the central controller 40, mixed reality controller 70, or other component on the system 10 may transmit the digital sound recordings to the audio devices 100, for example in response to instructions from the mixed reality viewer 200 or other component.

In other embodiments, the mixed reality viewer 200 may communicate with the network 50 (and devices connected thereto, including displays) over a wireless interface 64 with the wireless access point 60. The wireless interface 64 may include a Wi-Fi link, a Bluetooth link, an NFC link, etc. In still further embodiments, the mixed reality viewer 200 may communicate simultaneously with both the audio device 100 over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a Wi-Fi link.

The wireless interfaces 62, 64 allow the mixed reality viewer 200 to coordinate the generation and rendering of mixed reality images and audio to the user via the mixed reality viewer 200 and audio devices 100.

In some embodiments, the system 10 includes a mixed reality controller 70. The mixed reality controller 70 may be a computing system that communicates through the network 50 with the audio devices 100 and the mixed reality viewers 200 to coordinate the generation and rendering of virtual images and audio to one or more users using the mixed reality viewers 200 and audio devices 100. The mixed reality controller 70 may be implemented within or separately from the central controller 40.

In some embodiments, the mixed reality controller 70 may coordinate the generation and display of the virtual images of the same virtual object to more than one user by more than one mixed reality viewer 200. As described in more detail below, this may enable multiple users to interact with the same virtual object together in real time, either as a shared experience to multiple users or to each user individually, as desired.

The mixed reality controller 70 may store a three-dimensional wireframe map of a gaming area, such as a casino floor, and may provide the three-dimensional wireframe map to the mixed reality viewers 200. The wireframe map may store various information about displays and other games or locations in the gaming area, such as the identity, type and location of various types of displays, games, etc. The three-dimensional wireframe map may enable a mixed reality viewer 200 to more quickly and accurately determine its position and/or orientation within the gaming area, and also may enable the mixed reality viewer 200 to assist the user in navigating the gaming area while using the mixed reality viewer 200.

In some embodiments, at least some processing of virtual audio and/or images that are rendered by the mixed reality viewers 200 and/or audio devices 100 may be performed by the mixed reality controller 70, thereby offloading at least some processing requirements from the mixed reality viewers 200. The mixed reality viewer may also be able to communicate with other aspects of the system 10, such as a back bet server 80 or other device through the network 50.

Referring to FIGS. 2A to 2E, the mixed reality viewer 200 may be implemented in a number of different ways. For example, referring to FIG. 2A, in some embodiments, a mixed reality viewer device 200A may be implemented as a 3D headset 220 including a pair of semitransparent lenses 212 on which images of virtual objects may be displayed. Different stereoscopic images may be displayed on the lenses 212 to create an appearance of depth, while the semitransparent nature of the lenses 212 allow the user to see both the real world as well as the 3D image rendered on the lenses 212. The device 200A may be implemented, for example, using a Hololens™ from Microsoft Corporation. The Microsoft Hololens includes a plurality of cameras and other sensors that the device uses to build a 3D model of the space around the user. The device 200A can generate a 3D image to display to the user that takes into account the real-world objects around the user and allows the user to interact with the 3D object.

The device 200A may further include other sensors, such as a gyroscopic sensor, a GPS sensor, one or more accelerometers, and/or other sensors that allow the device 200A to determine its position and orientation in space. In further embodiments, the device 200A may include one or more cameras that allow the device 200A to determine its position and/or orientation in space using visual simultaneous localization and mapping (VSLAM). The device 200A may further include one or more microphones and/or speakers that allow the user to interact audially with the device.

Figure 2A:
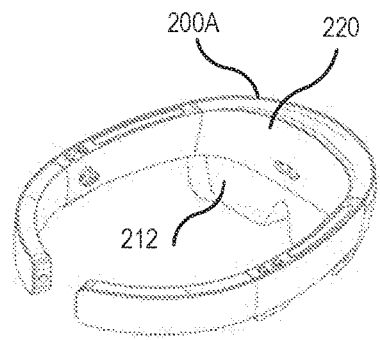
FIGS. 2A to 2E illustrate mixed reality viewer devices and gaming devices according to various embodiments.
Figure 2B:
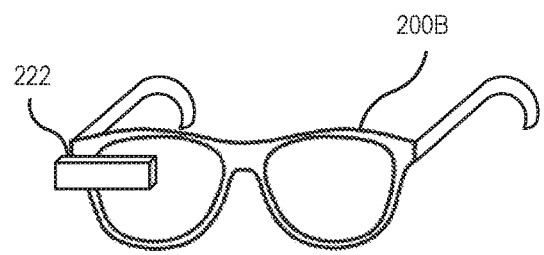

Referring to FIG. 2B, a mixed reality viewer device 200B may be implemented as a pair of glasses including a transparent prismatic display 222 that displays an image to a single eye of the user. An example of such a device is the Google Glass device. Such a device 200B may be capable of displaying images to the user while allowing the user to see the world around the user, and as such can be used as a mixed reality viewer.

Figure 2C:
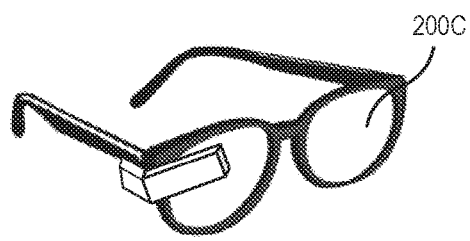
Figure 2D:
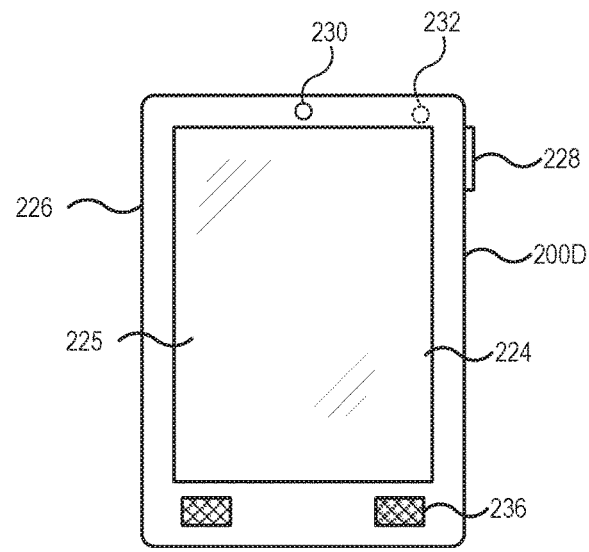

In other embodiments, referring to FIG. 2C, the mixed reality viewer may be implemented using a virtual retinal display device 200C. In contrast to devices that display an image within the field of view of the user, a virtual retinal display raster scans an image directly onto the retina of the user. Like the device 200B, the virtual retinal display device 200C combines the displayed image with surrounding light to allow the user to see both the real world and the displayed image.

In still further embodiments, a mixed reality viewer device 200D may be implemented using a mobile wireless device, such as a mobile telephone, a tablet computing device, a personal digital assistant, or the like. The device 200D may be a handheld device including a housing 226 on which a touchscreen display device 224 including a digitizer 225 is provided. An input button 228 may be provided on the housing and may act as a power or control button. A front facing camera 230 may be provided in a front face of the housing 226. The device 200D may further include a rear facing camera 232 on a rear face of the housing 226. The device 200D may include one or more speakers 236 and a microphone. The device 200D may provide a mixed reality display by capturing a video signal using the rear facing camera 232 and displaying the video signal on the display device 224, and also displaying a rendered image of a virtual object over the captured video signal. In this manner, the user may see both a mixed image of both a real object in front of the device 200D as well as a virtual object superimposed over the real object to provide a mixed reality viewing experience.

Figure 2E:
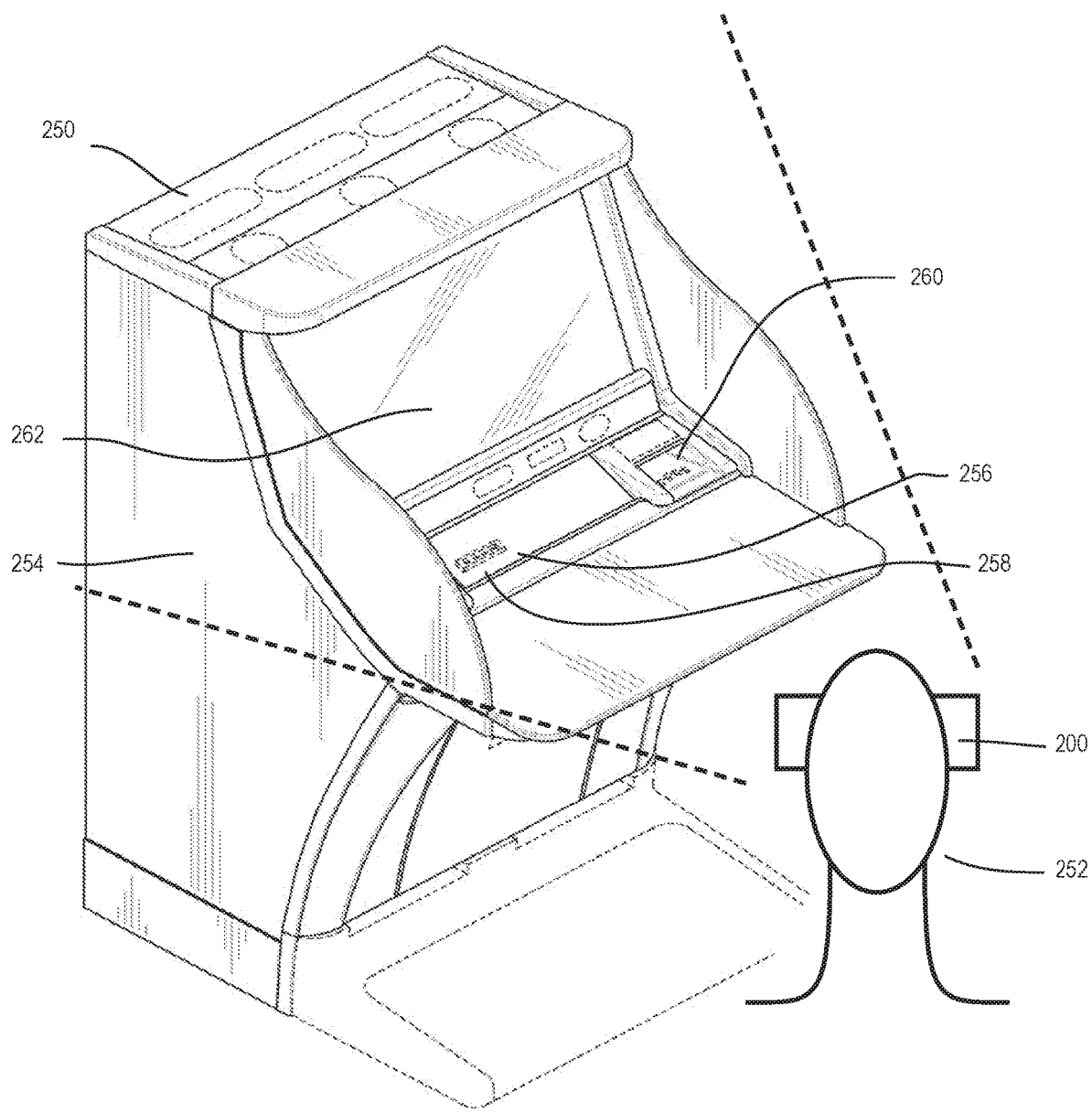

Referring now to FIG. 2E, a gaming device 250 may include a display device 262 for providing video content, gaming content, or other content to a user 252 wearing a mixed reality viewer 200. In this example, gaming device 250 is an electronic gaming machine (EGM), which may be located in a casino environment, or other suitable location. In this example, the gaming device 250 includes a housing 254 and a plurality of input devices 256, such as a keypad or buttons 258, etc., for receiving user input for playing the wagering game and otherwise interacting with the gaming device 250. In some embodiments, the display device 262 may include a touchscreen interface for receiving user input as well. The display device 262 may also be a single display device or may include multiple display devices, such as a first display device for displaying video content and a second display device for displaying gaming and wagering information for example. The gaming device 250 may include additional specialized hardware as well, such as an acceptor/dispenser 260, for receiving items such as currency (i.e., bills and/or coins), tokens, credit or debit cards, or other physical items associated with monetary or other value, and/or for dispensing items, such as physical items having monetary or other value (e.g., awards or prizes) or other items. It should also be understood that in some embodiments, the gaming device 250 may include an acceptor and/or a dispenser as separate components. The mixed reality viewer 200 may communicate with the gaming device 250 to coordinate display of different video, gaming, and/or virtual elements to the user 252, or may operate independently of the gaming device 250, as desired.

Figure 3A:
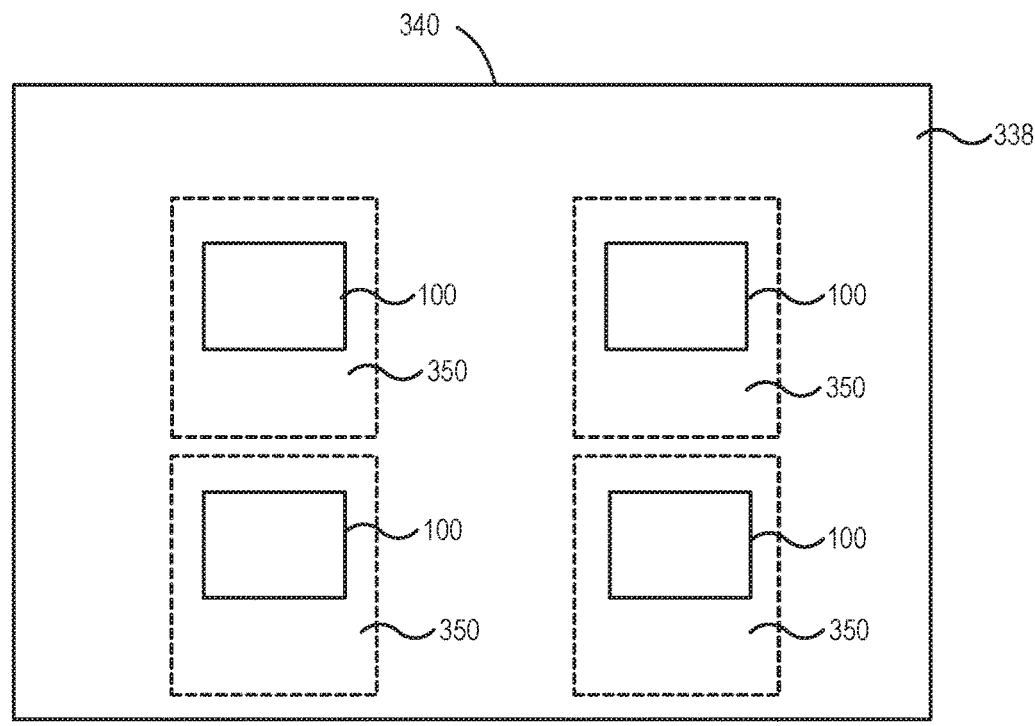
FIG. 3A is a map of a gaming area, such as a casino floor.

Referring now to FIG. 3A, an example map 338 of a gaming area 340 is illustrated in plan view. The gaming area 340 may, for example, be a casino floor. The map 338 shows the location of a plurality of audio devices 100 within the gaming area 340. As will be appreciated, the locations of the audio devices 100 and other objects (not shown) within a gaming area 340 are generally fixed, although a casino operator may relocate displays from time to time, within the gaming area 340. As noted above, in order to assist the operation of the mixed reality viewers (such as mixed reality viewers 200), the mixed reality controller 70 of FIG. 1 may store a three-dimensional wireframe map of the gaming area 340, and may provide the three-dimensional wireframe map to the mixed reality viewers.

Figure 3B:
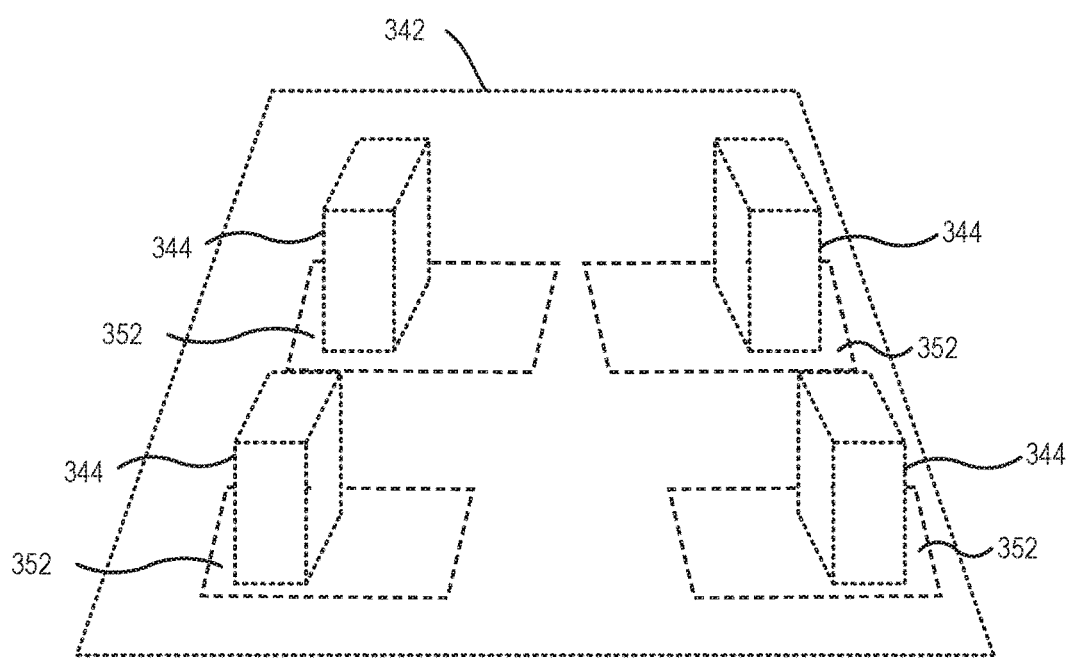
FIG. 3B is a 3D wireframe model of the gaming area of FIG. 3A.

An example of a wireframe map 342 is shown in FIG. 3B. The wireframe map is a three-dimensional model of the gaming area 340, such as a race and sports book, for example. As shown in FIG. 3B, the wireframe map 342 includes wireframe models 344 corresponding to the audio devices 100 that are physically in the gaming area 340. The wireframe models 344 may be pregenerated to correspond to various display form factors and sizes. The pregenerated models may then be placed into the wireframe map, for example, by a designer or other personnel. The wireframe map 342 may be updated whenever the physical location of displays in the gaming area 340 is changed.

In some embodiments, the wireframe map 342 may be generated automatically using a mixed reality viewer, such as a 3D headset, that is configured to perform a three-dimensional depth scan of its surroundings and generate a three-dimensional model based on the scan results. Thus, for example, an operator using a device 200A (FIG. 2A) may perform a walkthrough of the gaming area 340 while the device 200A builds the 3D map of the gaming area.

The three-dimensional wireframe map 342 may enable a mixed reality viewer to more quickly and accurately determine its position and/or orientation within the gaming area. For example, a mixed reality viewer may determine its location within the gaming area 340 using one or more position/orientation sensors. The mixed reality viewer then builds a three-dimensional map of its surroundings using depth scanning, and compares its sensed location relative to objects within the generated three-dimensional map with an expected location based on the location of corresponding objects within the wireframe map 342. The mixed reality viewer may calibrate or refine its position/orientation determination by comparing the sensed position of objects with the expected position of objects based on the wireframe map 342. Moreover, because the mixed reality viewer may have access to the wireframe map 342 of the entire gaming area 340, the mixed reality viewer can be aware of objects or destinations within the gaming area 340 that it has not itself scanned. Processing requirements on the mixed reality viewer may also be reduced because the wireframe map 342 is already available to the mixed reality viewer.

In some embodiments, the wireframe map 342 may store various information about displays or other games and locations in the gaming area, such as the identity, type, orientation and location of various types of displays, the locations of exits, bathrooms, courtesy desks, cashiers, ATMs, ticket redemption machines, etc. Additional information may include a predetermined region 350 around each audio device 100, which may be represented in the wireframe map 342 as wireframe models 352. Such information may be used by a mixed reality viewer to help the user navigate the gaming area. For example, if a user desires to find a destination within the gaming area, the user may ask the mixed reality viewer for directions using a built-in microphone and voice recognition function in the mixed reality viewer or use other hand gestures or eye/gaze controls tracked by the mixed reality viewer (instead of or in addition to voice control). The mixed reality viewer may process the request to identify the destination, and then may display a virtual object, such as a virtual path on the ground, virtual arrow, virtual sign, etc., to help the user to find the destination. In some embodiments, for example, the mixed reality viewer may display a halo or glow around the destination to highlight it for the user, or have virtual 3D sounds coming from it so users could more easily find the desired location.

According to some embodiments, a user of a mixed reality viewer may use the mixed reality viewer to obtain information about players and/or displays on a casino gaming floor. The information may be displayed to the user on the mixed reality viewer in a number of different ways such as by displaying images on the mixed reality viewer that appear to be three dimensional or two-dimensional elements of the scene as viewed through the mixed reality viewer. In general, the type and/or amount of data that is displayed to the user may depend on what type of user is using the mixed reality viewer and, correspondingly, what level of permissions or access the user has. For example, a mixed reality viewer may be operated in one of a number of modes, such as a player mode, an observer mode or an operator mode. In a player mode, the mixed reality viewer may be used to display information about particular displays on a casino floor. The information may be generic information about a display or may be customized information about the displays based on the identity or preferences of the user of the mixed reality viewer. In an observer mode, the mixed reality viewer may be used to display information about particular displays on a casino floor or information about players of displays on the casino floor. In an operator mode, which is described in greater detail below, the mixed reality viewer may be used to display information about particular displays or other games on a casino floor or information about players of displays or other games on the casino floor, but the information may be different or more extensive than the information displayed to an observer or player.

Figure 4:
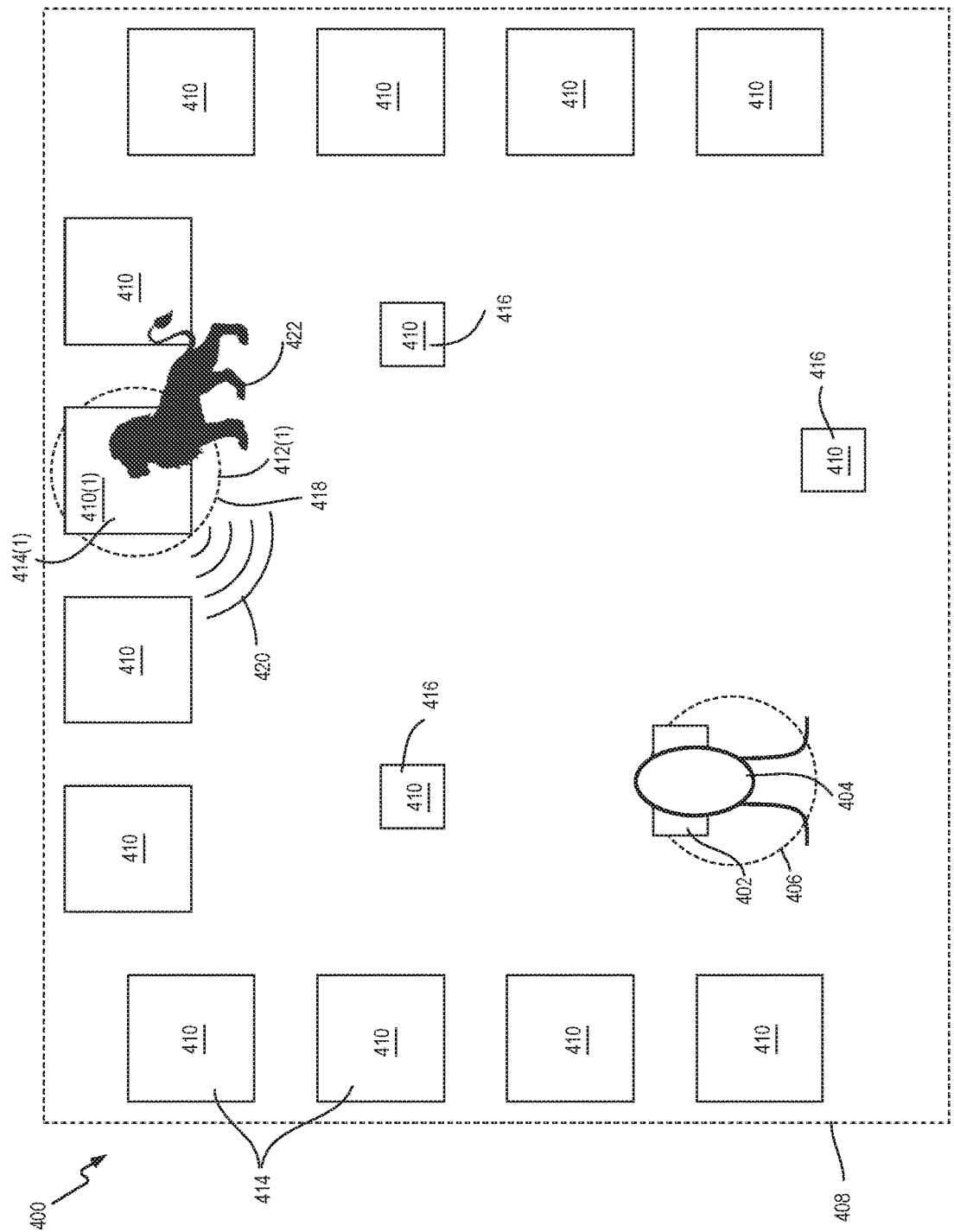
FIG. 4 is a view of a system for providing mixed reality audio using a gaming device in a casino environment, according to an embodiment.

These and other embodiments also provide a unique solution to the technical problem of providing more realistic and immersive mixed reality experience. In this regard, FIG. 4 is a view of a system 400 for providing mixed reality audio using a gaming device in a casino environment, according to an embodiment. A mixed reality device 402 is worn or carried by a device user 404 at a mixed reality device position 406 within an environment 408 (which is a casino environment in this embodiment). The mixed reality device 402 provides mixed reality content to the device user 404, such as a visual mixed reality element 422 for example. The environment 408 includes a plurality of audio devices 410 at different audio device positions 412 within the environment 408. The audio devices 410 may include gaming devices 414, such as electronic gaming machines, for example, and may also, or alternatively, include other devices having one or more speakers 416 or otherwise having the capability of producing sound.

In this embodiment, a virtual source position 418 for a mixed reality audio element 420 is determined. The mixed reality audio element may be associated with the mixed reality content (such as the visual mixed reality element 422, for example), and may be selected to complement the mixed reality content and may be timed to synchronize with the mixed reality content to create a more immersive experience. The virtual source position 418 is determined in relation to the mixed reality device position 406, and an audio device position 412(1) of a particular audio device 410(1) is determined with respect to the mixed reality device position 406 and the virtual source position 418 within the environment 408. In this example, the particular audio device 410(1) having an audio device position 412(1) that corresponds to the virtual source position 418 within the environment 408. The particular audio device 410(1) generates the mixed reality audio element 420 so that device user 404 of the mixed reality device 402 perceives the mixed reality audio element 420 as originating from the virtual source position 418 within the environment 408. For example, in this example, the visual mixed reality element 422 is a lion positioned at the virtual source position 418, which is proximate to and/or adjacent to the audio device position 412(1) of the particular gaming device 414(1) that contains the particular audio device 410(1). To draw the attention of the device user 404 toward the particular gaming device 414(1), the audio device 410(1) (e.g., speaker) of the particular gaming device 414(1) generates a roar sound so that the device user 404 perceives a lion roaring in proximity to the particular gaming device 414(1).

Figure 5A:
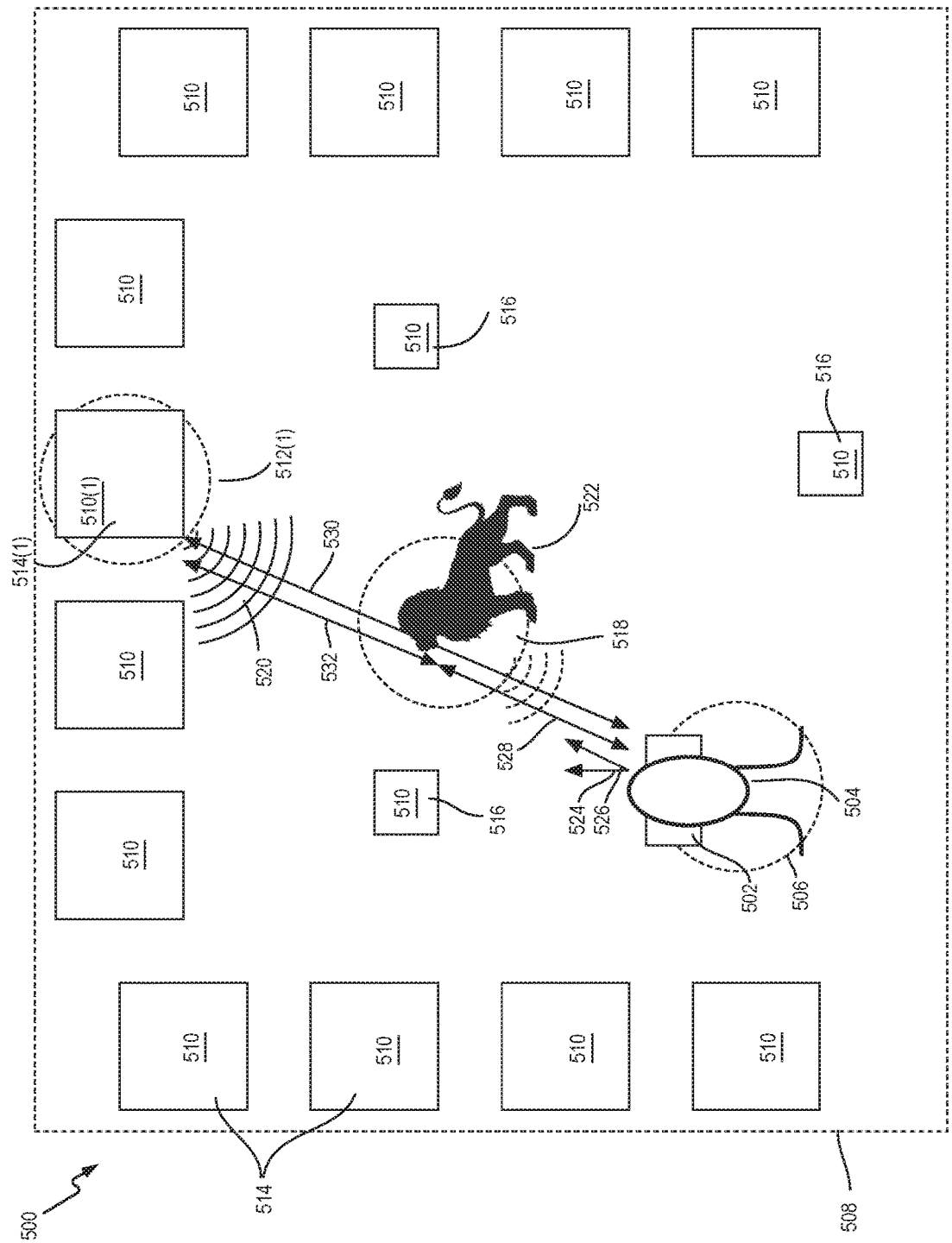
FIGS. 5A and 5B are views of another system for providing mixed reality audio using a gaming device in a casino environment, according to an embodiment.
Figure 5B:
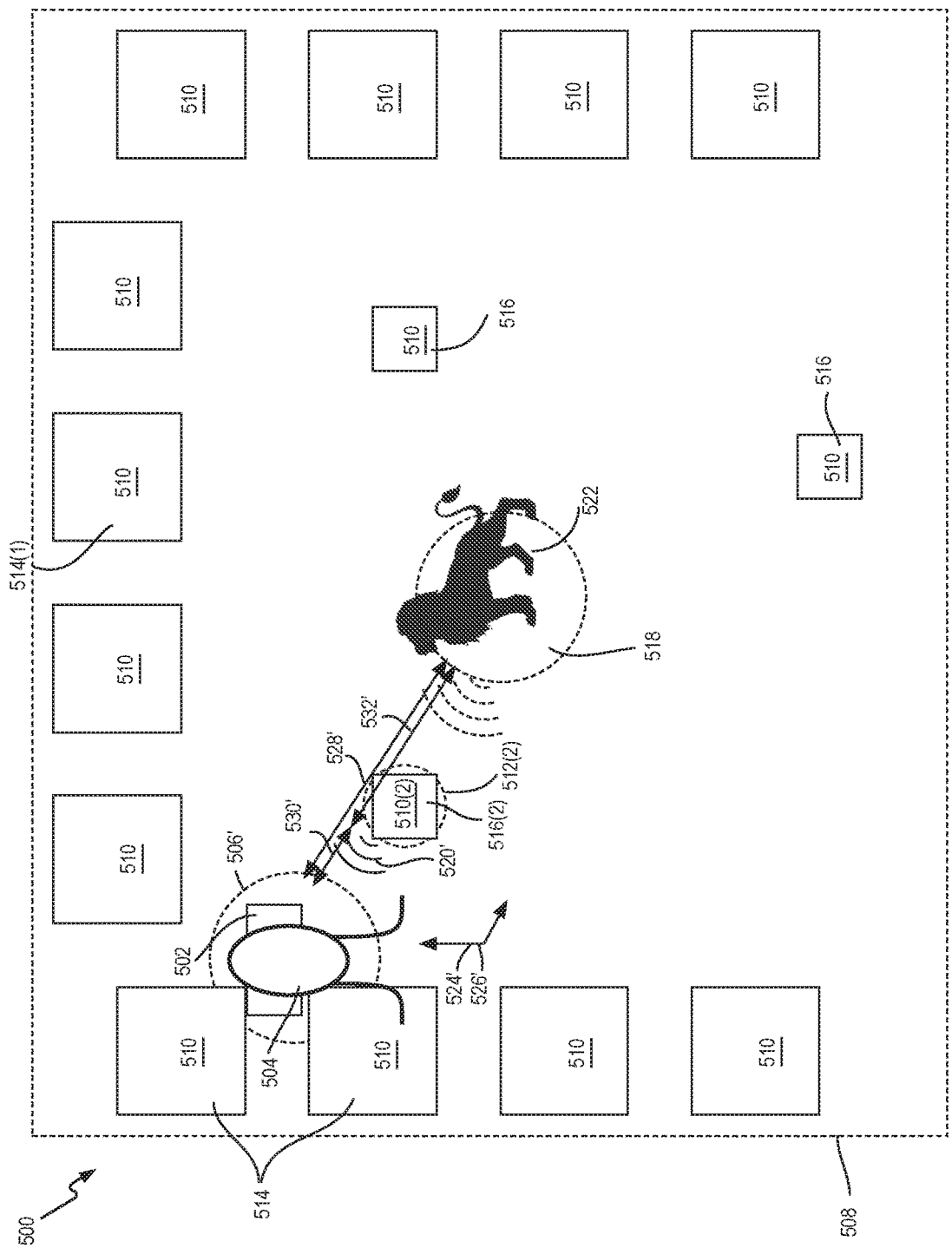

In some embodiments, the virtual source position 418 of the mixed reality audio element 420 may not exactly match a particular audio device position 412 of a single audio device 410. In this regard, FIGS. 5A and 5B are views of another system 500 for providing mixed reality audio using a gaming device in a casino environment, according to an embodiment. In this example, similar to the system 400 of FIG. 4, the system 500 of FIGS. 5A and 5B includes a mixed reality device 502 being worn or carried by a device user 504 at a mixed reality device position 506 in an environment 508, which also includes a plurality of audio devices 510 (e.g., gaming devices 514, speaker devices 516, etc.) at respective audio device positions 512 within the environment 508. In this example, because the virtual source position 518 for the mixed reality audio element 520 (and visual mixed reality element 522) does not correspond to any one audio device 510, the system 500 determines a virtual source orientation 524 of the virtual source position 518 with respect to the mixed reality device position 506.

The system 500 then selects an audio device position 512(1) of a particular audio device 510(1) that has an audio device orientation 526(1) that is substantially collinear with the virtual source orientation 524 of the virtual source position 518, with respect to the mixed reality device position 506. In this example, the virtual source position 518 is a first distance 528 from the mixed reality device position 506 and the audio device position 512(1) of the particular audio device 510(1) is a second distance 530 from the mixed reality device position 506. To compensate for the difference 532 in distance, a virtual source amplitude (e.g., volume) is determined for the mixed reality audio element, and an audio device amplitude is determined for the particular audio device 510(1) based on the difference 532 in distance. In this embodiment, because the second distance 530 is greater than the first distance 528, the audio device amplitude is greater than the virtual source amplitude, so that user perceives the mixed reality audio element that is originating from the audio device position 512(1) of the particular audio device 510(1) as originating from the virtual source position 518 at the virtual source amplitude.

Referring now to FIG. 5B, as the device user 504 moves around within the environment 508, the mixed reality device 502 similarly moves to an updated mixed reality device position 506', which may cause the audio device position 512(1) of the particular audio device 510(1) to have an updated audio device orientation 526' that is no longer collinear with an updated virtual source orientation 524' of the virtual source position 518 with respect to the updated mixed reality device position 506'.

To compensate for the updated mixed reality device position 506', the system 500 may update the mixed reality audio element 520 to cause the device user 504 of the mixed reality device 502 to continue perceiving the updated mixed reality audio element 520' as originating from the virtual source position 518 within the environment 508. In this example, the system 500 may select another audio device position 512(2) of another audio device 510(2) that has an audio device orientation 526(2) that is substantially collinear with the updated virtual source orientation 524' of the virtual source position 518, with respect to the updated mixed reality device position 502'. In this example, the virtual source position 518 is an updated first distance 528' from the updated mixed reality device position 506' and the audio device position 512(2) of the another audio device 510(2) is an updated second distance 530' from the updated mixed reality device position 506'. Because the updated second distance 530' is now smaller than the updated first distance 528', the another audio device 510(2) generates the updated mixed reality audio element 520' at an updated audio device amplitude that is smaller than the virtual source amplitude, to compensate for the updated difference 532' in distance between the updated first distance 528' and updated second distance 530', so that user continues to perceive the updated mixed reality audio element 520' that is originating from the audio device position 512(2) of the another audio device 510(2) as originating from the virtual source position 518 at the virtual source amplitude. Similarly, the system 500 may update the virtual source position 518 over time to account for movement of the visual mixed reality element 522 within the environment 508 over time. For example, the visual mixed reality element 522 (a lion in this embodiment) could pace the casino floor over time, and the system 500 could update the virtual source position 518 to match the location of the lion and select different audio devices 510 that produce the sounds of footsteps, which would follow the virtual animal to provide a more realistic mixed reality experience.

Figure 6A:
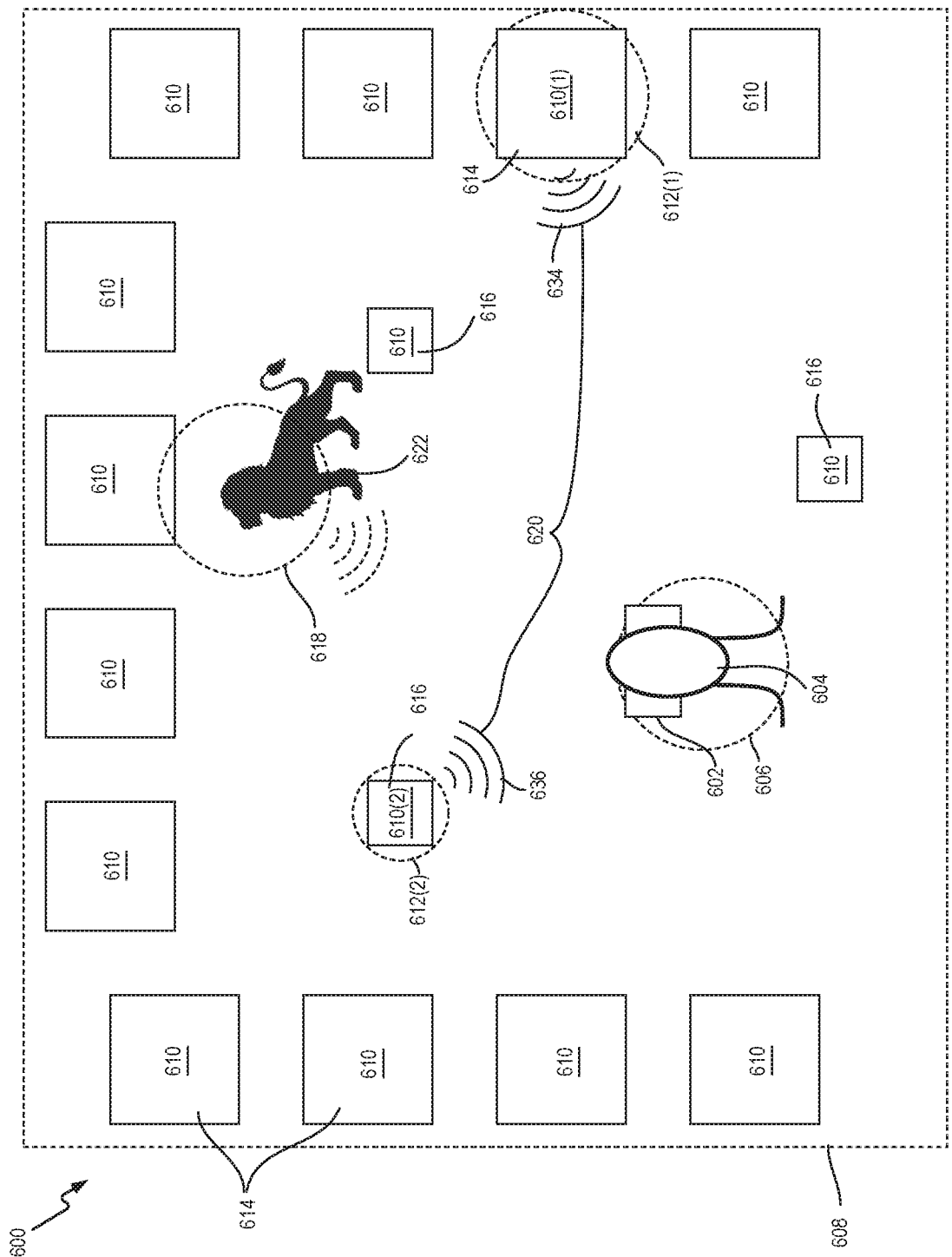
FIGS. 6A and 6B are views of a system for providing multi-channel mixed reality audio, according to an embodiment.
Figure 6B:
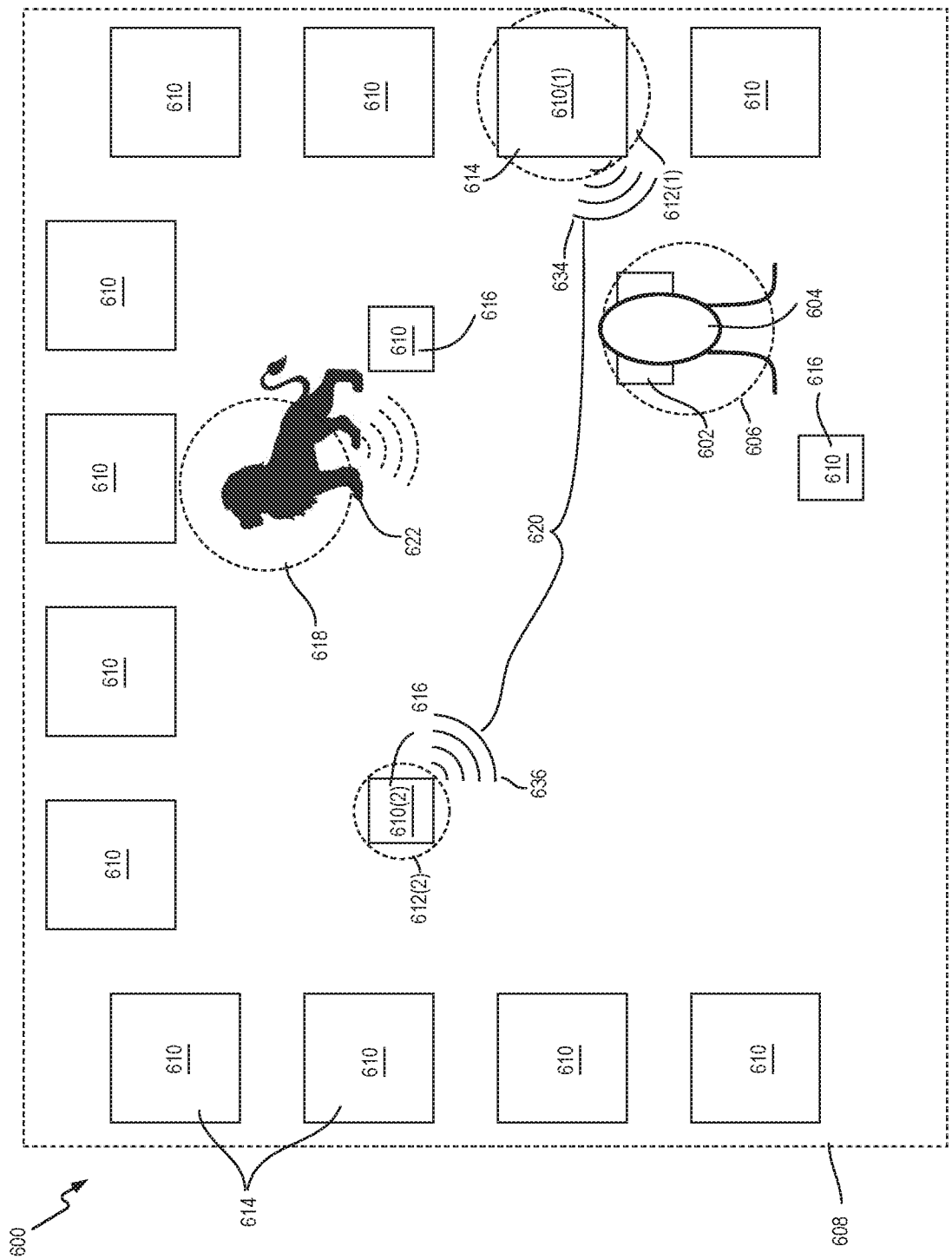

While the above embodiments describe using a single audio device to generate the mixed reality audio element, it should be understood that multiple audio devices may be employed to generate individual or multiple mixed reality audio elements to produce stereophonic, directional, or other multi-channel audio effects, which may generate a 3D or partial-3D spatial sound effect for the user, and which may increase immersion and enjoyment for the user. In this regard, FIGS. 6A and 6B are views of a system 600 for providing multi-channel mixed reality audio, according to an embodiment. In this example, similar to the systems 400 and 500 above, the system 600 of FIGS. 6A and 6B includes a mixed reality device 602 being worn or carried by a device user 604 at a mixed reality device position 606 in an environment 608, which also includes a plurality of audio devices 610 (e.g., gaming devices 614, speaker devices 616, etc.) at respective audio device positions 612 within the environment 608.

Based on the relative positions of the virtual source position 618 and the various audio device positions 612, with respect to the mixed reality device position 606, the system 600 selects a first audio device 610(1) and a second audio device 610(2) to produce a respective first component 634 and a respective second component 636 of the mixed reality audio element 620 to produce a stereophonic effect that causes the device user 604 to perceive the first component 634 originating from the first audio device position 612(1) and the second component 636 originating from the second audio device position 612(2) as the mixed reality audio element 620 originating from the virtual source position 618, e.g., so as to be associated with a visual mixed reality element 622.

Referring now to FIG. 6B, in response to the device user 604 moving to an updated mixed reality device position 606', the first component 634 and the second component 636 are updated so that the device user 604 continues to perceive the updated first component 634' and the updated second component 636' as the updated mixed reality audio element 620' originating from the virtual source position 618. The updated first component 634' and updated second component 636' may continue to be generated by the respective first audio device 610(1) and second audio device 610(2), or may be generated by different audio devices 610, as desired.

In some embodiments, the mixed reality device may include one or more of the audio devices, and one or more of the components of the mixed reality audio element may be generated by the audio device(s) of the mixed reality device. In some examples, a first component of the mixed reality audio element may include a first frequency range having a first center frequency that is in the audible frequency range, i.e., between 20 Hz and 20 kHz. A second component may include a second frequency range having a second center frequency lower than the first center frequency. In some embodiments, the second center frequency may in an inaudible frequency range, e.g., below 20 Hz, so that the second component is detected by the device user as a vibration or rumble that is felt as opposed to, or in addition to a sound that is heard. For example, the audio device producing the second component may include a vibration generation device to produce the vibration that is detected by the device user. Because it is more difficult for the human ear to detect an orientation or direction of lower frequency sounds and vibrations, lower frequencies (e.g., bass or sub-bass) may be produced proximate to the mixed reality device, while higher frequencies (e.g., treble) may be produced by audio devices proximate to the virtual source location. In this manner, the various audio devices across the environment do not need to produce loud, low frequency sounds, which in turn allows the various audio devices to use smaller speakers and consume less power.

Figure 7:
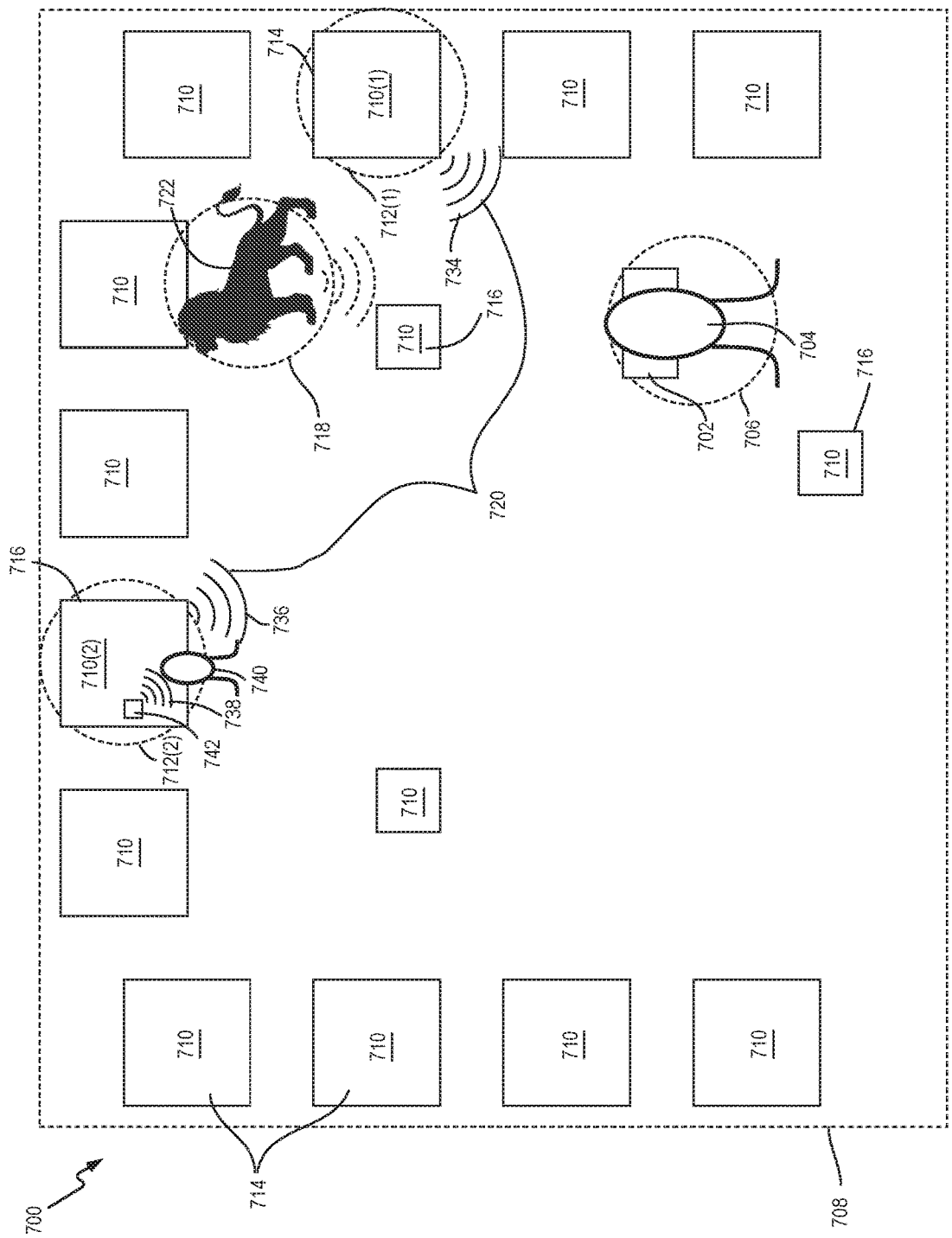
FIG. 7 is a view of another system for providing mixed reality audio using a gaming device in a casino environment, according to an embodiment.

It may also be desirable to direct the mixed reality audio elements toward the device user while minimizing the detectability of the mixed reality audio elements by other users in the environment, such as users of other gaming devices within the environment. In this regard FIG. 7 is a view of another system 700 for providing mixed reality audio using a gaming device in a casino environment, according to an embodiment. In this example, similar to the systems 400, 500, and 600 above, the system 700 of FIG. 7 includes a mixed reality device 702 being worn or carried by a device user 704 at a mixed reality device position 706 in an environment 708, which also includes a plurality of audio devices 710 (e.g., gaming devices 714, speaker devices 716, etc.) at respective audio device positions 712 within the environment 708.

In this embodiment, a particular audio device 710(1), which is part of a particular gaming device 714(1) at an audio device position 712(1), generates a mixed reality audio element 720 (or a component thereof) that may be audible to a user 740 of the particular gaming device 714(1). In this example, the particular audio device 710(1) generates a first component 734 of the mixed reality audio element 720 and another audio device 710(2) generates a second component 736 of the mixed reality audio element 720 so that the device user 704 perceives the mixed reality audio element 720 as originating from the virtual source position 718 e.g., so as to be associated with a visual mixed reality element 722. However, this may also enable the user 740 of the particular gaming device 714(1), who may not be interested in the mixed reality content, to hear the mixed reality audio element 720 (or components thereof) as well, which may distract the user 740.

This issue may be addressed in a number of ways. For example, the audio device 710(1) of the gaming device 714(1) may be a directional audio device that is capable of focusing the mixed reality audio element 720 toward the mixed reality device position 706 while minimizing the audibility of the mixed reality audio element 720 for the user 740 of the gaming device 714(1). Suitable directional audio devices may include ultrasonic emitters, parabolic reflectors, etc. The gaming device 714(1) may also include localized noise-cancelling features, such as an additional speaker 742 that directs a noise-cancelling audio element 738 toward the user 740. For example, the noise-cancelling audio element 738 may be 180 degrees out of phase with the mixed reality audio element 720, so that the noise-cancelling audio element 738 destructively interferes with the sound waves of the mixed reality audio element 720 and causes the mixed reality audio element 720 to be inaudible in a particular location, such as the location proximate to the gaming device 714(1). This allows the device user 704 to hear the mixed reality audio element 720 produced by the gaming device 714(1) while minimizing the distraction caused by the mixed reality audio element 720 to a user 740 who may be using the gaming device 714(1) at the same time.

In another example, the system 700 may determine whether another person is at a predetermined position with respect to a particular audio device 710(1), such as the user 740 at the gaming device 714(1), and may also, or alternatively, select another audio device 710 based in part on a determination that another user is not at the predetermined position, so as to minimize distraction for other user that are not using the mixed reality device 702 or who may be otherwise uninterested in the mixed reality content. For example, the system 700 may determine that a gaming device 714 is occupied based on whether the gaming device 714 being used to play a wagering game, or based on a proximity sensor or camera associated with the gaming device 714.

These and other embodiments allow for unique mixed reality experiences. For example, a user may locate and open a virtual treasure chest on a casino floor to acquire a prize or award. The system may determine a location on the casino floor with one or more unoccupied gaming machines, and the system could navigate the user to the determined location and present the mixed reality experience using the audio capabilities of the gaming device(s). In some embodiments, the system could disable one or more gaming devices that are needed for the mixed reality experience to avoid another player from using the gaming device before or during the audio playback in support of the mixed reality experience.

In one embodiment the system may modify the mixed reality experience to correspond to the available audio devices in the environment. For example, if a casino is very busy and very few gaming devices are available, the system could select one of the available gaming devices and position the virtual source location of the mixed reality elements so that the audio of that gaming device may be used. As noted above, other audio devices, such as kiosks, standalone environmental audio devices (e.g., speakers which may be attached to ceilings or signage, for example) may be used instead of or in addition to gaming devices, so increase potential options and device combinations for providing audio content.

In some embodiments, the system may tailor the mixed reality elements so that multiple users, who each may or may not have a mixed reality device, can participate in the mixed reality experience. For example, where multiple users are each using a mixed reality device in a casino, the mixed reality experience could be exactly the same or slightly different between the multiple users, with all of the users hearing the same sounds at their different locations, or hearing different sounds tailored to their individual mixed reality experiences.

These and other features may be implemented as operations that may be executed by a processor circuit of a computing device. In this regard, FIG. 8 is a flowchart illustrating operations 800 of systems/methods according to some embodiments. The operations 800 may include determining, by a processor circuit, a mixed reality device position of a mixed reality device providing mixed reality content to a user in an environment comprising a plurality of audio devices (Block 802). The operations 800 may further include determining a virtual source position for a mixed reality audio element with respect to the mixed reality device position within the environment, wherein the mixed reality audio element is associated with the mixed reality content (Block 804). The operations 800 may further include causing a particular audio device of the plurality of audio devices to generate the mixed reality audio element to cause the user of the mixed reality device to perceive the mixed reality audio element as originating from the virtual source position within the environment (Block 806).

Figure 9:
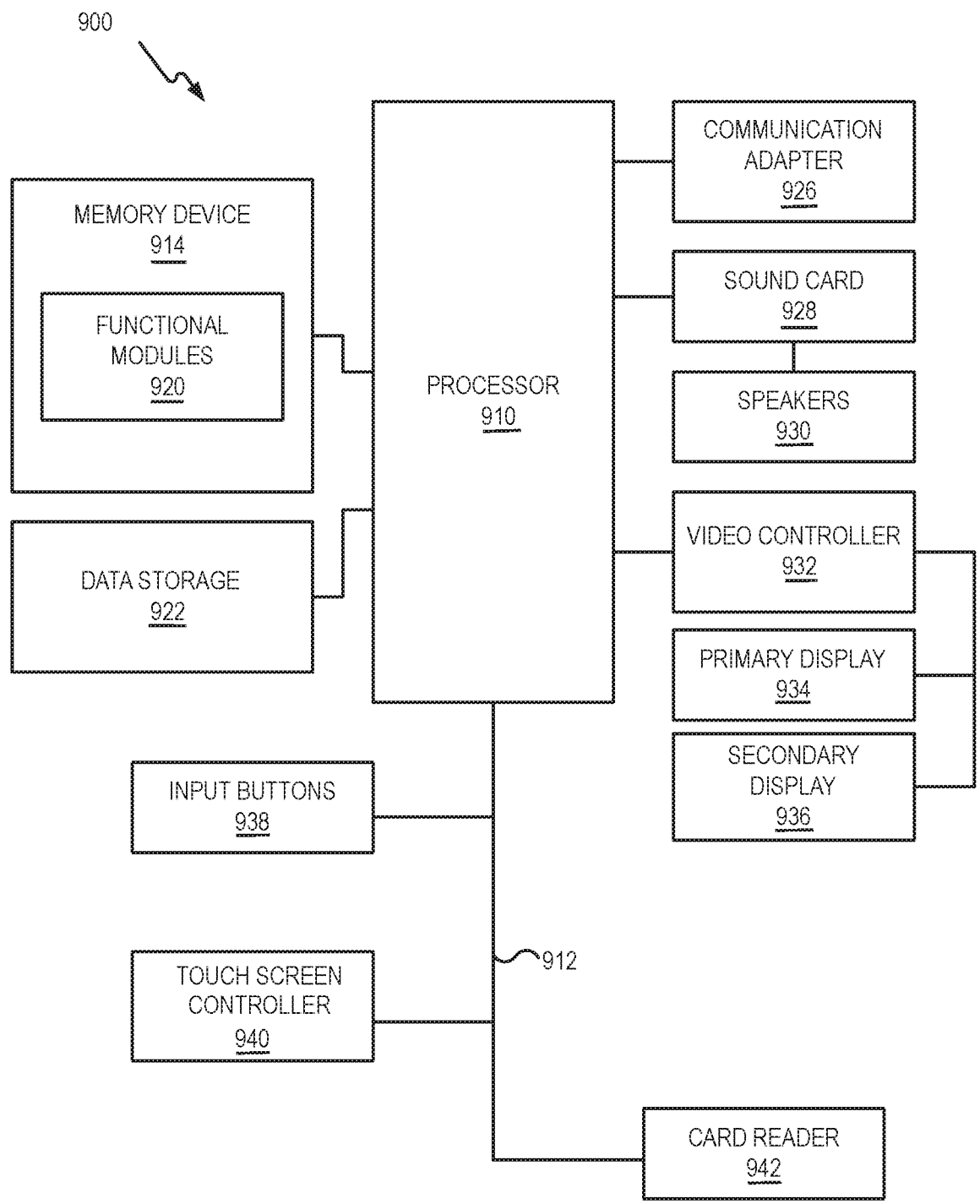
FIG. 9 is a schematic block diagram illustrating various components of a computing device according to some embodiments.

Referring now to FIG. 9, a block diagram that illustrates various components of a computing device 900, which may embody or be included as part of the devices, systems, and/or components above, according to some embodiments. As shown in FIG. 9, the computing device 900 may include a processor circuit 910 that controls operations of the computing device 900. Although illustrated as a single processor, multiple special purpose and/or general-purpose processors and/or processor cores may be provided in the computing device 900. For example, the computing device 900 may include one or more of a video processor, a signal processor, a sound processor and/or a communication controller that performs one or more control functions within the computing device 900. The processor circuit 910 may be variously referred to as a "controller," "microcontroller," "microprocessor" or simply a "computer." The processor circuit 910 may further include one or more application-specific integrated circuits (ASICs).

Various components of the computing device 900 are illustrated in FIG. 9 as being connected to the processor circuit 910. It will be appreciated that the components may be connected to the processor circuit 910 and/or each other through one or more busses 912 including a system bus, a communication bus and controller, such as a USB controller and USB bus, a network interface, or any other suitable type of connection.

The computing device 900 further includes a memory device 914 that stores one or more functional modules 920 for performing the operations described above. Alternatively, or in addition, some of the operations described above may be performed by other devices connected to the network, such as the network 50 of the system 10 of FIG. 1, for example. The computing device 900 may communicate with other devices connected to the network to facilitate performance of some of these operations. For example, the computing device 900 may communicate and coordinate with certain displays to identify elements of a race being displayed by a particular display.

The memory device 914 may store program code and instructions, executable by the processor circuit 910, to control the computing device 900. The memory device 914 may include random access memory (RAM), which can include non-volatile RAM (NVRAM), magnetic RAM (ARAM), ferroelectric RAM (FeRAM) and other forms as commonly understood in the gaming industry. In some embodiments, the memory device 914 may include read only memory (ROM). In some embodiments, the memory device 914 may include flash memory and/or EEPROM (electrically erasable programmable read only memory). Any other suitable magnetic, optical and/or semiconductor memory may operate in conjunction with the gaming device disclosed herein.

The computing device 900 may include a data storage 922 for storing data from the memory 914 or other components. The computing device 900 may also include a communication adapter 926 that enables the computing device 900 to communicate with remote devices, such as the wireless network, another computing device 900, and/or a wireless access point, over a wired and/or wireless communication network, such as a local area network (LAN), wide area network (WAN), cellular communication network, or other data communication network, e.g., the network 50 of FIG. 1.

The computing device 900 may include one or more internal or external communication ports that enable the processor circuit 910 to communicate with and to operate with internal or external peripheral devices, such as a sound card 928 and speakers 930, video controllers 932, a primary display 934, a secondary display 936, input buttons 938 or other devices such as switches, keyboards, pointer devices, and/or keypads, a touch screen controller 940, a card reader 942, currency acceptors and/or dispensers, cameras, sensors such as motion sensors, mass storage devices, microphones, haptic feedback devices, and/or wireless communication devices. In some embodiments, internal or external peripheral devices may communicate with the processor through a universal serial bus (USB) hub (not shown) connected to the processor circuit 910. Although illustrated as being integrated with the computing device 900, any of the components therein may be external to the computing device 900 and may be communicatively coupled thereto. Although not illustrated, the computing device 900 may further include a rechargeable and/or replaceable power device and/or power connection to a main power supply, such as a building power supply.

In some embodiments, the computing device 900 may include a head mounted device (HMD) and may include optional wearable add-ons that include one or more sensors and/or actuators. Including ones of those discussed herein. The computing device 900 may be a head-mounted mixed-reality device configured to provide mixed reality elements as part of a real-world scene being viewed by the user wearing the computing device 900.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system for providing mixed-reality audio comprising:
a processor circuit; and
a memory coupled to the processor circuit, the memory comprising machine-readable instructions that, when executed by the processor circuit, cause the processor circuit to:

determine a mixed reality device position of a mixed reality device providing mixed reality content to a user in an environment comprising a plurality of audio devices;

determine a mixed reality audio element associated with the mixed reality content;

determine a virtual source position for the mixed reality audio element with respect to the mixed reality device position within the environment;

determine an audio device position of a particular audio device of the plurality of audio devices with respect to the mixed reality device position and the virtual source position within the environment, wherein the audio device position is different from the mixed reality device position; and based on the audio device position, the mixed reality device position, and the virtual source position, cause the particular audio device to generate the mixed reality audio element to cause the user of the mixed reality device to perceive the mixed reality audio element as originating from the virtual source position within the environment.

2. The system of claim 1, wherein the environment comprises a casino environment, and wherein the plurality of audio devices comprises a plurality of gaming devices within the casino environment.

3. The system of claim 1, wherein the virtual source position corresponds to the audio device position of the particular audio device.

4. The system of claim 1, wherein the machine-readable instructions further cause the processor circuit to:

determine a change in position of the mixed reality device;

update the mixed reality device position based on the determined change in position;

update the mixed reality audio element to cause the user of the mixed reality device to continue perceiving the mixed reality audio element originating from the audio device position as originating from the virtual source position within the environment; and cause the particular audio device to generate the updated mixed reality audio element.

5. The system of claim 1, wherein the machine-readable instructions that determine the audio device position further cause the processor circuit to:

determine a virtual source orientation of the virtual source position with respect to the mixed reality device position; and select the audio device position of the particular audio device, wherein the audio device position comprises an audio device orientation that is substantially collinear with the virtual source orientation of the virtual source position with respect to the mixed reality device position.

6. The system of claim 5, wherein the machine-readable instructions further cause the processor circuit to:

determine a virtual source amplitude for the mixed reality audio element;

determine a first distance between the virtual source position and the mixed reality device position;

determine a second distance between the audio device position and the mixed reality device position;

based on a difference between the first distance and the second distance, determine an audio device amplitude different from the virtual source amplitude to cause the user to perceive the mixed reality audio element originating from the audio device position as originating from the virtual source position at the virtual source amplitude; and cause the particular audio device to generate the mixed reality audio element at the audio device amplitude.

7. The system of claim 5, wherein the machine-readable instructions further cause the processor circuit to:

determine a change in position of the mixed reality device;

update the mixed reality device position based on the determined change in position;

determine the virtual source orientation of the virtual source position with respect to the updated mixed reality device position;

select another audio device position of another audio device comprising another audio device orientation that is substantially collinear with the virtual source orientation of the of the virtual source position with respect to the updated mixed reality device position;

update the mixed reality audio element to cause the user of the mixed reality device to continue perceiving the mixed reality audio element originating from the another audio device position as originating from the virtual source position within the environment; and cause the another audio device to generate the updated mixed reality audio element.

8. The system of claim 1, wherein the particular audio device comprises a first audio device at a first audio device position different from the virtual source position and a second audio device at a second audio device position different from the virtual source position, and wherein the machine-readable instructions that cause the particular audio device to generate the mixed reality audio element further cause the processor circuit to:

cause the first audio device to generate a first component of the mixed reality audio element; and cause the second audio device to generate a second component of the mixed reality audio element while the first audio device generates the first component to cause the user of the mixed reality device to perceive the first component originating from the first audio device position and the second component originating from the second audio device position as the mixed reality audio element originating from the virtual source position.

9. The system of claim 8, wherein the machine-readable instructions further cause the processor circuit to:

determine a change in position of the mixed reality device;

update the mixed reality device position based on the determined change in position;

update the first component of the mixed reality audio element; and update the second component of the mixed reality audio element while the first component is updated to cause the user of the mixed reality device to continue to perceive the updated first component originating from the first audio device position and the updated second component originating from the second audio device position as the mixed reality audio element originating from the virtual source position.

10. The system of claim 1, wherein the mixed reality content comprises a mixed reality visual element corresponding to the audio mixed reality element, and wherein the machine-readable instructions further cause the processor circuit to cause the mixed reality device to display the mixed reality visual element via a display device of the mixed reality device while the mixed reality audio element is generated to cause the user of the mixed reality device to perceive the mixed reality audio element as being located at the virtual source position within the environment.

11. The system of claim 1, wherein the plurality of audio devices comprises a mixed reality audio device coupled to the mixed reality device, and
wherein the machine-readable instructions that cause the particular audio device to generate the mixed reality audio element further cause the processor circuit to:
cause a first audio device of the plurality of audio devices to generate a first component of the mixed reality audio element; and
cause the mixed reality audio device to generate a second component of the mixed reality audio element.

12. The system of claim 11, wherein the first component of the mixed reality audio element comprises a first frequency range comprising a first center frequency, wherein the first center frequency is between 20 Hz and 20 kHz, and
wherein the second component of the mixed reality audio element comprises a second frequency range comprising a second center frequency lower than the first center frequency.

13. The system of claim 12, wherein the second center frequency is lower than 20 Hz.

14. The system of claim 11, wherein the mixed reality audio device comprises a vibration generation device, and
wherein the machine readable instructions that cause the mixed reality audio device to generate the second component further cause the vibration generation device to generate a vibration that is detectable by the user of the mixed reality device.

15. The system of claim 1, wherein the particular audio device comprises a directional audio device, and
wherein the machine readable instructions that cause the particular audio device to generate the mixed reality audio element further cause the directional audio device to direct the mixed reality audio element toward the mixed reality device position.

16. The system of claim 1, wherein the machine-readable instructions further cause the processor circuit to:
determine a noise cancellation audio element based on the mixed reality audio element, wherein the noise cancellation audio element is 180 degrees out of phase with a portion of the mixed reality audio element; and
cause one of the plurality of audio devices to generate the noise cancellation audio element to cause the portion of the mixed reality audio element to be inaudible at a noise cancellation position different from the mixed reality device position.

17. The system of claim 1, wherein the machine-readable instructions further cause the processor circuit to:
determine, for each audio device of the plurality of audio devices, whether another person is at a predetermined position with respect to the audio device; and
select the particular audio device based in part on determining that another person is not at the predetermined position with respect to the particular audio device.

18. The system of claim 17, wherein the virtual source position corresponds to the audio device position of the particular audio device,
wherein the mixed reality content comprises a mixed reality visual element corresponding to the audio mixed reality element, and
wherein the machine-readable instructions further cause the processor device to cause the mixed reality device to display the mixed reality visual element via a display device of the mixed reality device while the mixed reality audio element is generated to cause the user of the mixed reality device to perceive the mixed reality audio element as being located at the virtual source position within the environment.

19. A method for providing mixed-reality audio comprising:
determining, by a processor circuit, a mixed reality device position of a mixed reality device providing mixed reality content to a user in an environment comprising a plurality of audio devices at a plurality of audio device positions different from the mixed reality device position;
determining a virtual source position for a mixed reality audio element with respect to the mixed reality device position within the environment, wherein the mixed reality audio element is associated with the mixed reality content;
selecting a particular audio device of the plurality of audio devices based on the virtual source position and the mixed reality device position; and
causing the particular audio device to generate the mixed reality audio element to cause the user of the mixed reality device to perceive the mixed reality audio element as originating from the virtual source position within the environment.

20. A system for providing mixed-reality audio comprising:
a mixed reality device;
a plurality of electronic gaming devices at a plurality of gaming device positions in a casino environment;
a processor circuit; and
a memory coupled to the processor circuit, the memory comprising machine-readable instructions that, when executed by the processor circuit, cause the processor circuit to:
cause the mixed reality device to provide mixed reality content to a user in the casino environment;
determine a virtual source position for a mixed reality audio element with respect to a mixed reality device position of the mixed reality device within the environment, wherein the mixed reality audio element is associated with the mixed reality content, and wherein the virtual source position is associated with a gaming device position of a first electronic gaming device of the plurality of electronic gaming devices; and
cause the first electronic gaming device to generate the mixed reality audio element.

* * * * *